Figure 1:
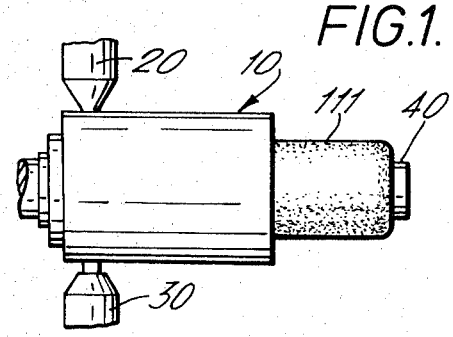

United States Patent [19]
Meudec

[11] 3,859,017
[45] Jan. 7, 1975

[54] EXTRUSION OF SHEATH ONTO ELONGATED SUPPORT USING DECOMPRESSION ZONES

[75] Inventor: Henri Meudec, Paris, France

[73] Assignee: Rol, Yonne, France

[22] Filed: May 7, 1973

[21] Appl. No.: 357,661

Related U.S. Application Data
[63] Continuation-in-part of Ser. No. 220,523, Jan. 24, 1972, abandoned, which is a continuation of Ser. No. 12,639, Feb. 19, 1970, abandoned.

[30] Foreign Application Priority Data
Feb. 20, 1969 France .............................. 69.04362

[52] U.S. Cl. ................................ 425/113, 425/380
[51] Int. Cl. .............................................. B29f 3/10
[58] Field of Search ........ 425/113, 326 R, 376, 380, 425/462

[56] References Cited
UNITED STATES PATENTS
2,978,748  4/1961  McCauley et al. .................. 425/380
3,159,877  12/1964  Orsini .................................. 425/113

FOREIGN PATENTS OR APPLICATIONS
538,698  12/1955  Belgium ............................. 425/113
641,340  5/1962  Canada ............................ 425/326 R
1,205,264  11/1965  Germany ............................ 425/113

Primary Examiner—R. Spencer Annear
Attorney, Agent, or Firm—Stevens, Davis, Miller & Mosher

[57] ABSTRACT

An extrusion head for coating an elongated support with a plastic material comprises a body attached to an extruder which contains in succession in coaxial relationship first and second decompression chambers separated by homogenizing and flow-equilibrating distributor means, an expansion chamber and die means. The support is axially introduced into the extrusion head where the plastic material is decompressed, homogenized and uniformly distributed around the periphery of the support and then deposited in the form of an unconstricted sheath onto the support. The plastic material flows under pressure and the sheath moves toward the die carrying with it the support on which it is deposited. The sheath is then constricted onto the support to form a compacted homogeneous coating of predetermined thickness.

6 Claims, 4 Drawing Figures

PATENTED JAN 7 1975 3,859,017

EXTRUSION OF SHEATH ONTO ELONGATED SUPPORT USING DECOMPRESSION ZONES

This application is a continuation-in-part of my copending application Ser. No. 220,523 filed Jan. 24, 1972 and now abandoned, which was in turn a continuation application of my application Ser. No. 12,639 filed Feb. 19, 1970 and now abandoned.

The present invention relates to a process and apparatus for depositing a plastic material onto a support. More particularly, it relates to the preparation of rubbercoated rollers and to an apparatus whereby this is accomplished.

The term "plastic" as used herein refers in general to a polymeric material which is yieldable under stress and includes unvulcanized rubber compounds, heat softened thermoplastics and plasticized resins.

One of the previously known processes consists of surrounding a cylinder to be coated with a sheet of unvulcanized rubber of desired thickness, freshening with a solvent the overlapping surfaces to be joined, gluing the sheet to the cylinder, supporting the coated cylinder with bands of textile to tighten the whole in place, and vulcanizing the rubber coating in an autoclave. In another process, the rubber is applied to the cylinder as a band wound spirally about the cylinder surface, and then cured in an autoclave. These processes produce rubber rolls in which joints frequently show up as deffects. Another process consists of preforming a hollow rubber sleeve which is then threaded onto the metal cylinder to be coated. This latter process is of little use industrially for it is limited to the preparation of small diameter rollers.

The present invention is aimed at a process of coating an elongated support with a plastic material without the formation of an overlap joint. Another object of the invention is to provide an apparatus which comprises a means for homogenizing the plastic material and evenly coating the support. Yet a further object is the provision of improved industrial products such as coated supports and in particular rollers comprising a coating of plastic material.

According to one aspect of the present invention there is provided an extrusion head for coating a support with a plastic material as hereinbefore defined, comprising a substantially cylindrical elongated body having at one end a first opening for the introduction of said plastic material under pressure in a generally radial direction and a second opening for the axial introduction of a solid or hollow elongated support, and, at the other end, a third opening for the axial exit of the coated support; said body containing, in succession in the axial direction:

a. a first decompression chamber,
b. a homogenizing and flow-equilibrating distributor means,
c. a second decompression chamber,
d. an expansion chamber, and
e. a die means;

the first decompression chamber being an annular chamber defined in part by the walls of said body encircling said support and being in communication with said first opening; the second decompression chamber being an annular chamber encircling said support and separated from the first chamber by said homogenizing and flow-equilibrating distributor means; said latter means comprising an annular diaphragm having a constricting passageway therethrough for homogenizing and evenly distributing said plastic material around the second decompression chamber; said second chamber communicating with the expansion chamber through an annular orifice, said expansion chamber being defined by a divergent outflow cone forming said material into an unconstricted sheath, and said die means being associated with said exit and having an inwardly convergent wall for forming and constricting a compacted coating of desired thickness onto said support.

According to another aspect of the invention, there is provided a process for coating a support with a plastic material as hereinbefore defined which comprises the steps of:

a. feeding under pressure said material into one end of a substantially cylindrical elongated hollow extrusion head having an elongated support centrally inserted in an axial position, b. homogenizing and evenly distributing said material around the periphery of the support within said apparatus, c. depositing said material on said support in the form of an unconstricted sheath, and d. constricting said sheath onto said support to form a compacted coating of predetermined thickness while moving said support with the sheath deposited thereon towards an exit end of the apparatus.

In yet a further aspect the invention relates to improved industrial products coated according to the present process; the products may be in the form of coated articles having tubular, rectangular or other profile, ribbons, wires, cables, and so on, particularly coated cylinders which may be solid or hollow.

Figure 2:
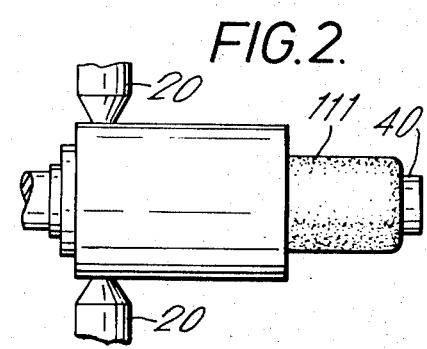
Figure 3:
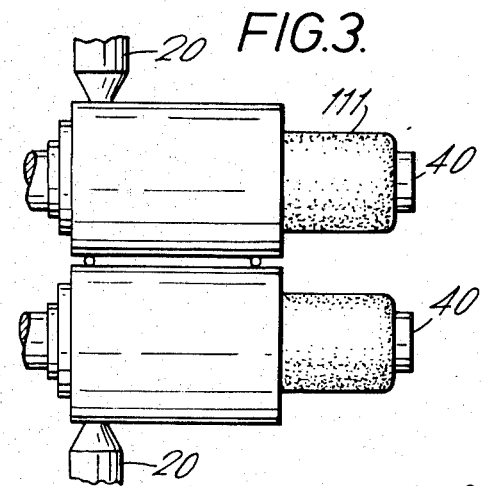
Figure 4:
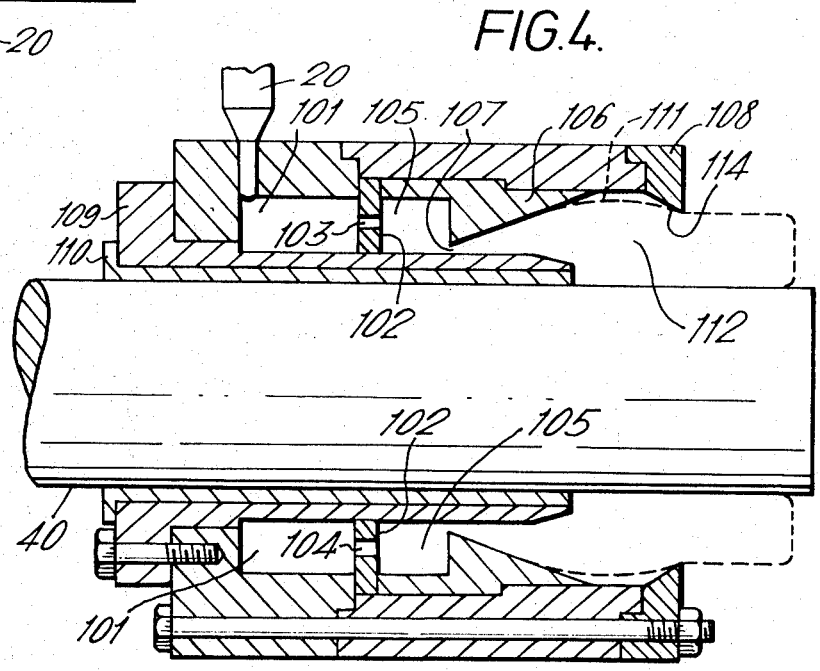

An extrusion head and a coating process in accordance with the invention will now be described, by way of example only, with reference to the accompanying drawing, in which:

FIGS. 1, 2 and 3 are diagrammatic representations of various configurations in which the extrusion head may be used; and FIG. 4 is a cross-sectional view of a preferred embodiment of the invention.

The extrusion head according to the invention as represented in the figures has a cylindrical form and is open at its two extremities for the entry and exit of the support to be coated; it contains a series of zones in the form of annular chambers through which coating material passes. The extrusion head has an elongated body, the wall of which resists the pressure under which the coating material is introduced, which pressure may be about 100 kg/cm² or more. A plunger-type or screw-type polymer extrusion machine may be used for the introduction of plastic material.

The body of the extrusion head of the present invention, as designated in the drawing by reference 10, is directly connected to the nozzle 20 of a polymer extrusion machine. To counterbalance the pressure exerted by the extrusion machine on the apparatus, opposite to the entry from this extrusion machine one can place either a jack 30 as represented on FIG. 1, or another extrusion machine as shown by the arrangement in FIG. 2, or a combination of two extrusion machines each with the attached extrusion head 10 according to the invention as represented in FIG. 3, or any other equivalent installation which ensures the stability of the apparatus during the operation.

With reference to FIG. 4, the preferred extrusion head of the invention has at one end, i.e. the end at which a cylindrical support 40 is introduced, a first decompression chamber 101 of annular form encircling the support. This chamber 101 is connected directly to the nozzle 20, and the passage of plastic material takes place through a homogenizing and flow-equilibrating distributor means indicated at 102.

The homogenizing and flow-equilibrating distributor means comprises an annular diaphragm 102 encircling the support coaxially with chamber 101. Said means 102 contains a number of passageways such as 103 and 104 extending through the diaphragm through which the plastic material flows. The passageways are preferably of various sizes. The essential functions of means 102 is to homogenize and to distribute the material from the extrusion machine evenly around the periphery of the support to be coated. Thus, in FIG. 4, there is shown a passageway 103 of smaller diameter near to the nozzle 20 and a passageway 104 of larger diameter at the opposite side remote from the nozzle 20. While the dimensions of the passageways may vary the aggregate effect of their diameters may be determined experimentally and is a function of the type of plastic material used for coating. Once the type of plastic material to be used for coating is chosen, e.g. a rubber compound, the conditions of temperature and pressure are practically fixed, allowing only slight variations. The rate of flow of plastic material is then adjusted by varying the size or number of constricting passageways 103 and 104 through the homogenizing and flow-equilibrating distributor means 102.

A variation of said means 102, it will be clearly seen, may comprise a diaphragm having, instead of the discrete passageways 103 and 104, a single annular passageway formed by enlarging its central aperture. In order to obtain the proper distributional effect of the plastic material which is accomplished by progressively increasing the size of the passageways the further they are located from nozzle 20, the central aperture in the diaphragm may be formed eccentrically therein so that on assembly the annular passage provided for the plastic material flow will be narrow at positions adjacent nozzle 20 increasing in size to a maximum at positions diametrically opposed to the nozzle.

Homogenizing and flow-equilibrating distributor means according to the foregoing it must be understood is required by extrusion heads which are fed by only one extruder as in the installations depicted in FIG. 1 and FIG. 3. If two extruders are used as in FIG. 2, then the passageways 103 and 104 will be of regular size all around the diaphragm provided that the support to be coated have a diameter of less than 55 mm. Similarly, a single annular passageway between the support and the diaphragm of the means 102 would be a regular annulus.

After passing through homogenizing and flow-equilibrating distributor means 102, the plastic material is evenly distributed throughout a second decompression chamber 105 which is also of annular form. The annular chamber 105 is coaxial with the chamber 101 and the homogenizing and flow-equilibrating means 102, the latter forming a dividing wall between the chambers 101 and 105 as shown on FIG. 4. The chamber 105 is delimited by the wall of an outflow cone 106 which, with a main centering tubular insert 109, forms a constriction 107 in the form of an annular orifice through which the plastic material passes in the form of a sheath 111. The outflow cone 106 diverges towards the exit and, together with a die means 108, defines an expansion chamber 112 where the sheath is allowed to expand in an unconstricted fashion as indicated in phantom at 111.

The cylindrical support 40 is maintained coaxially within the extrusion head; by inserting it into a sleeve 110 having a bore of a size and a cross-section to fit the elongated support 40 and to permit the sliding motion of said support. The sleeve is housed in a main centering tubular insert 109 which extends into the apparatus through homogenizing and flow-equilibrating distributor means 102 and into expansion chamber 112, so that the decompression zones 101 and 105 are effectively separated and the plastic material has to pass through passageways 103 and 104. Sleeve 110 may be replaced by others having different sizes or cross-sections to fit different supports. It is also possible to dispense with the sleeve 110 and to use an extrusion head in which the insert 109 and sleeve 110 form an integral part. At the point where the sleeve 110 and insert 109 end and the compacted sheath is deposited directly on the support 40, the support is seized by the sheath moving under pressure toward the exit end of the extrusion head and carried thereby in the same direction.

Die means 108 at the exit of the extrusion head is in the form of a detachable ring having a convergent wall 114 which is presented to the surface of the sheath 111 as it passes through the die. Said die means may have an inner cross-sectioned area of any predetermined shape, for example, a support of circular section may be coated by a die means of square inner cross-sectioned area. The function of the die means 108 is to form and constrict the extruded sheath into a compacted coating of the desired thickness onto the support and especially to move the support 40 forward throughout the apparatus.

Operation of the extrusion head comprises pressure injecting the plastic coating material into the first decompression chamber 101, causing the thus decompressed material to move through the homogenizing and flow-equilibrating distributor means 102, thereby evenly distributing the coating material uniformly around the whole periphery of the support 40; transforming the material flowing from the means 102 into a sheath in the second decompression chamber 105; compacting the sheath and controlling the thickness of the sheath by forcing it through the constriction 107 of a predetermined dimension and through the die means 108; constricting the rubber sheath towards the support 40 whereby the sheath is firmly pressed onto the support to form a coating of a desired thickness, the thus coated support emerging from the exit of the apparatus. The coated support may, if desired, be vulcanized and subjected to finishing operations such as grinding and buffing.

It is noted that the apparatus of the invention may, in another embodiment, comprise in succession in coaxial relationship not only first and second decompression chambers separated by a first homogenizing and flow-equilibrating distributor means, but also a second homogenizing and flow-equilibrating distributor means, a third decompression chamber, and at last the expansion chamber and die means.

The present invention offers a number of advantages over previously known techniques. It permits the use of various polymers or blends thereof in a single apparatus having variable flow homogenizing means. It also permits the use of a single apparatus for coating cylindrical objects of various diameters or other profiles by simply changing a metal sleeve. The process also permits the elimination of solvents otherwise necessary to freshen surfaces of the coating to be adhesively joined. These solvents are often dangerous to the health of the personnel and to the safety of the premises.

The plastic material to be injected and employed as the coating may be one or more of a variety of polymeric materials which can be caused to flow under applied stress. Thus the material may be a rubber, natural or synthetic, usually in the form of a compound; it includes copolymers of butadiene/styrene, butadiene/acrylonitrile, polybutadiene, polyisoprene, butyl rubber, acrylate rubber, halogen-containing rubber, silicone-type rubber, polyurethane rubber, and so forth. The compounding of the rubber with fillers, curatives, and other ingredients is well known, as is the vulcanizing of such compounded rubber. The plastic material employed in this invention may also be based on resins not requiring vulcanization; they include thermoplastic polymers such as polyvinyl chloride, polymer of styrene, polymer of ethylene and propylene, as well as phenolic resins or polyester resins.

A further advantage of the process according to the invention is in that the support may be precoated with an adhesive and the adhesive is not lost in the process of depositing the plastic material. Also of interest is the fact that the operator can see the object as soon as it is coated, and therefore can stop or modify the operation as soon as a defect is noticed. This avoids the waste of expensive coating materials. It is also possible in the present process to pass the same cylindrical support several times through the apparatus in the event one desires to apply two or more successive coatings on a given support.

The output of the apparatus for coating is dependent on that of the extrusion machine. With the present apparatus operating continuously, one may achieve remarkable rates of production. For example, a cylindrical support measuring 25 millimeters in diameter and 370 millimeters in length was coated in 31 seconds to an external diameter of 52 millimeters with a rubbery compound.

This process produces non-porous coatings which are substantially free of surface defects and voids because of the successive decompression treatments which the plastic material undergoes as it expands into chambers 101, 105 and 112 thereby yielding for example coated rollers of greater service life. This is important in such applications as inking, varnishing, printing, paraffining, calendering, and so on. For example, employing coatings of identical mixture, it was demonstrated that the mechanical properties of a vulcanized coating produced according to the present invention were distinctly superior to those of coatings as prepared by conventional methods.

What is claimed is:

1. An extrusion head for coating a support with a plastic material comprising a substantially cylindrical elongated body having at one end a first opening for the introduction of said plastic material under pressure in a generally radial direction and a second opening for the axial introduction of a solid or hollow elongated support, and, at the other end, a third opening for the axial exit of the coated support; said body containing, in succession in the axial direction:
   a. a first decompression chamber,
   b. a homogenizing and flow-equilibrating distributor means,
   c. a second decompression chamber,
   d. an expansion chamber, and
   e. a die means;
the first decompression chamber being an annular chamber defined in part by the walls of said body encircling said support and being in communication with said first opening; the second decompression chamber being an annular chamber encircling said support and separated from the first chamber by said homogenizing and flow-equilibrating distributor means; said latter means comprising an annular diaphragm having a constricting passageway therethrough for homogenizing and evenly distributing said plastic material around the second decompression chamber; said second chamber communicating with the expansion chamber through an annular orifice, said expansion chamber being defined by a divergent outflow cone forming said material into an unconstricted sheath, and said die means being associated with said exit and having an inwardly convergent wall for forming and constricting a compacted coating of desired thickness onto said support.

2. The extrusion head of claim 1 wherein the body is cylindrical and the second and third openings are circular.

3. The extrusion head of claim 2 wherein said die means is a detachable ring having an internal land which converges in the direction of the exit.

4. The extrusion head of claim 2 wherein a main centering tubular insert is releasably secured to the exterior of the body and extends through the homogenizing and flow-equilibrating distributor means and forms internal walls of the first and second annular decompression chambers.

5. The extrusion head of claim 3 wherein the second opening is fitted with a detachable sleeve having a bore of a dimension adapted to fit the cross-section of the support.

6. The extrusion head of claim 4 wherein the constricting passageway of the said homogenizing and flow-equilibrating distributor means is a series of discrete passageways regularly disposed around the diaphragm, the said passageways being less restrictive at positions remote from the said first opening than the passageways at positions adjacent said first opening.

* * * * *